United States Patent [19]

Jongewaard

[11] Patent Number: 5,351,330
[45] Date of Patent: Sep. 27, 1994

[54] LASER DIODE-LENS ALIGNMENT

[75] Inventor: Erik N. Jongewaard, Sunnyvale, Calif.

[73] Assignee: Uniphase Corporation, San Jose, Calif.

[21] Appl. No.: 44,822

[22] Filed: Apr. 8, 1993

[51] Int. Cl.$^5$ .............................................. G02B 6/42
[52] U.S. Cl. ........................................ 385/93; 385/90
[58] Field of Search ....................... 372/6, 101; 385/78, 385/81, 84, 88, 90, 92, 93

[56] References Cited

U.S. PATENT DOCUMENTS

| | | | |
|---|---|---|---|
| 3,826,998 | 7/1974 | Kindl et al. | 331/94.5 |
| 5,189,716 | 2/1993 | Matsubara et al. | 385/93 |
| 5,208,888 | 5/1993 | Steinblatt et al. | 385/90 |

*Primary Examiner*—Frank Gonzalez
*Attorney, Agent, or Firm*—Flehr, Hohbach, Test, Albritton & Herbert

[57] ABSTRACT

An optical alignment structure is described for coupling the output of a laser diode to an optical fiber. The structure includes a rigid outer block which holds the laser diode in tight thermal contact, The block defines a cavity within which there is an optic axis along which the output from the diode flows. A coupling lens set is held within the cavity by a lens holder cantilevered within the same via a flex connection. Adjustment screws are provided extending through the block to adjust the position of the lens holder relative to the optic axis. The end of the optical fiber within which the radiation is to be coupled is held in position by a ferrule which is adjustable longitudinally along the optic axis. A selected position for the same along the axis is maintained via a set screw.

16 Claims, 1 Drawing Sheet

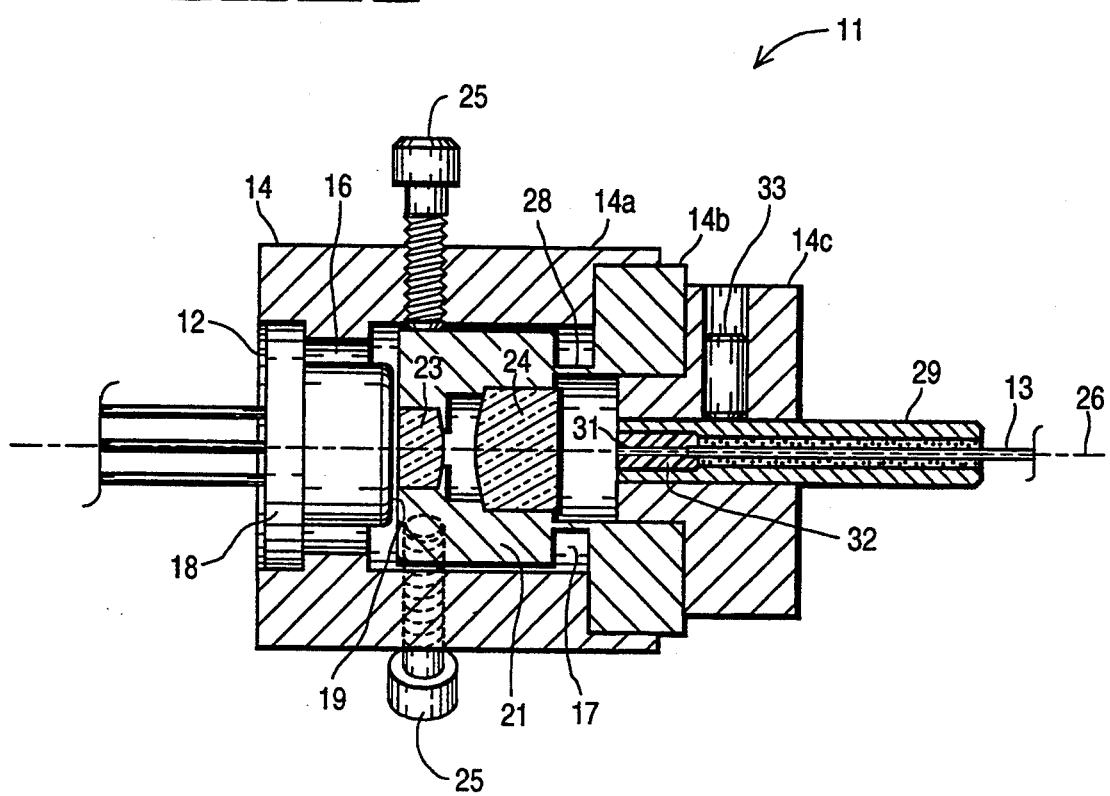
FIG_1
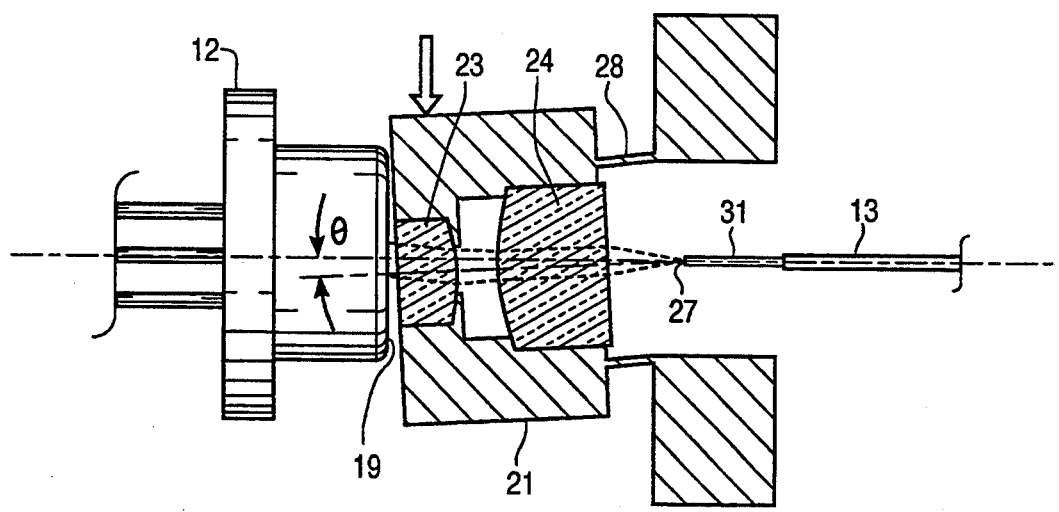
FIG_2

LASER DIODE-LENS ALIGNMENT

BACKGROUND OF THE INVENTION

This invention relates to an optical alignment structure for coupling optical radiation to an optical receiving device and, more particularly, to such a structure especially designed to couple the output of a laser diode to an optical fiber.

The light (optical radiation) emerging from a typical laser diode is highly divergent and elliptical. Some form of coupling optics, such as a spherical lens, graded index lens or a collimating/focusing lens set, is needed to match this light output to an optical receiving device, such as an optical fiber. This alignment becomes quite critical if it is desired to maximize coupling. For example, if the optical radiation from the laser diode is visible radiation having a wavelength of 670 nm, coupling of the same to a single mode optical fiber requires alignment precision within about ±0.5 microns. To prevent performance degradation over time, it is important that the coupling structure maintain this level of alignment throughout the lifetime of the laser diode/optical fiber combination.

Reasonably attained mechanical tolerances of the various components making up such a combination are such that the required level of precision generally cannot be obtained with the simple assembly of parts. Thus to compensate for part tolerances, some provision for precision alignment typically is provided. Prior coupling optics arrangements have often had fixed optics, and the diode and fiber have been moved in some combination in these prior arrangements until alignment is attained. Clearance must be allowed, of course, around any component that is adjusted, and some type of potting compound often is used to hold one or more components in alignment. Anomalous dimensional changes over a period of time are not uncommon where potting compounds are used, believed to be caused by shrinkage of the potting compounds. Moreover, thermal sinking of the parts, particularly when a laser diode is used as a source, is compromised if the parts are potted in place.

SUMMARY OF THE INVENTION

The present invention provides an optical alignment structure which enables quite precise alignment without the difficulties of prior art structures and methods. It is a combination of several parts and relationships. One of such parts is a rigid outer block having an opening for the receipt of optical radiation output from a source, such as a laser diode, into a cavity within such block. This outer block is, itself, made up of three different parts as will be described.

A lens holder within the block cavity positions coupling optics, i.e., one or more lenses, to interact with optical radiation flowing on an optic axis within such cavity. Means are included for adjusting the position of the holder relative to the block. Such means is simply realized by providing a plurality of adjustment screws threadably received in the block to change the transverse position of the coupling optics relative to the optic axis when turned. (The phrase "transverse position" relative to the optic axis is meant to include angular orientation or, in other words, tilting with respect to such axis. It will be recognized that tilting is simply a special case of transverse movement, i.e., not all parts of the device being tilted relative to the axis move transversely the same amount nor necessarily in the same direction.)

A ferrule is also provided as part of the combination, positioned to hold an optical receiving device, such as the end of an optical fiber, on the optic axis. The position of the ferrule on such axis is made to be adjustable longitudinally relative to the position of the block. Means are also provided for securing the ferrule and, hence, the particular receiving device held by the same at a selected position longitudinally of the optic axis. Such means most desirably includes a set screw which is threadably received in the block to bear against the ferrule and hold it in position.

The alignment structure of the invention is particularly designed for use with a laser diode and, most desirably, the block is configured to direct optical radiation from the radiation emission facet of such a laser diode along the optic axis. Most desirably, the laser diode is secured to the block in good thermal contact therewith. One end of the lens holder is also most desirably connected with a flex connection to the block so that such holder will be maintained in the cavity while the position adjustment discussed above is permitted.

Other features and advantages of the invention either will become apparent or will be described in connection with the following, more detailed description of a preferred embodiment of the invention.

BRIEF DESCRIPTION OF THE DRAWING

With reference to the accompanying drawing:

FIG. 1 is a side section view illustrating a preferred embodiment of the invention; and FIG. 2 is an enlarged schematic view illustrating an angular relationship to be described.

DETAILED DESCRIPTION OF THE PREFERRED EMBODIMENT(S)

The following relatively detailed description is provided to satisfy the patent statutes. It will be appreciated by those skilled in the art that various changes and modifications can be made without departing from the invention. Thus, insofar as the inventive aspects are concerned this description should not be considered exhaustive.

A preferred embodiment of the alignment structure of the invention is generally referred to in the figures with the reference numeral 11. It acts as structure for aligning and coupling the output of a laser diode represented at 12 with an optical receiving device in the form of a optical fiber 13. It also acts as a heat sink for the diode.

The structure 11 includes a rigid outer block 14 made up of three parts, a main part 14a, an intermediate part 14b, the purpose of which will become clear hereinafter, and an end closure part 14c. Such block has an opening 16 for the receipt of optical radiation within a cavity 17. That is, the base 18 of the diode 12 is press fit into an enlarged part of the opening 16 with the radiation emitting facet 19 of the diode projecting slightly into cavity 17. It should be noted that the block 14 is relatively thick and in good thermal contact with the diode base 18. Thus, it acts as a heat sink for the diode.

In keeping with the invention, a lens holder represented at 21 is suspended within the cavity 17. Such lens holder is generally annular in shape and positions coupling optics in the form of a lens set made up of lens 23 and lens 24 to interact with optical radiation flow on an optic axis 26 within the cavity. Such lens set has a focal point represented at 27 (FIG. 2) which is positioned as illustrated on the optic axis at the end of the optical fiber 13. As will be recognized by those skilled in the art, optical radiation focused on such end will be matched to the optical fiber for transmission thereby.

Lens holder 21 is cantilevered into position in the cavity 17 by a flex connection 28 which is integral with, and extends from, intermediate block part 14b. Such flex connection is a centilever which is cylindrical in shape and enables the position of the lens holder 21 and, hence, the lens set made up of the lens 23 and 24, to be moved transversely relative to the optic axis 26. Three adjustment screws 25 equally spaced about the main block part 14a (only two of which can be seen) are threadably received within the same to bear against the exterior surface of the lens holder and to change its tilt relative to the optic axis when turned. Because the three adjustment screws are equally spaced from another (120° apart) about the main block part, turning of the same adjusts the tilt about two axes (not shown) that are orthogonally related to one another.

As a key aspect of the invention, the flex connection is selected to place the movement center of the lens set on the optic axis. Moreover, this center is selected to be the focal point 27 of the coupling optics. As best understood by reference to the enlarged, schematic view in FIG. 2, this simplifies the alignment task to one in which the radiation transmission axis of the lens set need only be moved transversely in angle to provide the desired transverse optical alignment. (It should be noted that the angle, angle $\theta$, indicated in FIG. 2 for the misalignment due to the adjustment is highly exaggerated.) The output of the laser diode 12 is captured by the lens 23 and directed as is illustrated to the focal point 27. As discussed previously, the focal point 27 is on the optic axis and the movement adjustment will not affect the position of such focal point. It should be noted that tilt adjustment about the center creates fine translational movement relative to the optic axis.

The aspect ratio (length/diameter) of the flex connection to the end of the intermediate block part is small so that shear deformation is a large component of the total deformation. This has the effect of positioning the movement center to the right of the flex connection as shown in the drawing.

The end of the optical fiber is maintained in position along the optic axis by a ferrule sleeve 29. As is illustrated, sleeve 29 extends along the optic axis 26 through an opening in the end closure block part 14c. The fiber itself is made up of an outer cladding sleeve which circumscribes an optically transparent core 31 that extends beyond the end of the cladding. The core is held in position on the optic axis by a thin sleeve 32 in an end of the ferrule 29. The optical fiber and the thin sleeve 32 are, in turn, held rigidly within the ferrule by a potting compound or the like.

In keeping with the invention, the position of the ferrule and, hence, the end Of the optical fiber is adjustable longitudinally along the optic axis. That is, as can be seen from FIG. 1, movement of the ferrule inward and outward of the block along the optic axis is not impeded. Its position can be moved along the optic axis as is necessary to optimize the desired radiation coupling. A set screw 33 is threadably received within the end closure block part 14c to bear against the exterior surface of the ferrule and hold it in a selected position longitudinally along the optic axis.

It will be seen with the above construction that the desired coupling can be achieved and optimized simply by adjusting the position of the lens holder with the screws 25 and moving the end of the optic fiber inward or outward as necessary. The construction of the invention limits potential movement only to that required to align the optical elements. The result is that the alignment procedure is simplified and the long-term stability of the assembly is greatly improved. Moreover, no special separate tooling is necessary—alignment is achieved with parts of the assembly. The use of potting materials to maintain alignment also is minimized. The structure provides a heat sink for the laser diode and it is closed with the result that optical elements are protected from adverse environmental effects.

As mentioned at the beginning of the detailed description, applicant is not limited to the specific embodiment described above. Various changes and modifications can be made. For example, the basic aspects of the invention are useful for coupling output optical radiation to coupling optics irrespective of whether or not a ferrule or other structure is provided for adjusting the translational position of an optical receiving device. Moreover, those aspects of the structure relating to the relationship of the ferrule to the optic axis defined by the block are also separately useful. In another arrangement, the flex connection 28 can be plastically deformed by the adjustment screws 25 or external tooling and then removed. The precision alignment of the lens is then maintained by virtue of the permanent distortion of the flex connection.

The claims, their equivalents and their equivalent language define the scope of protection.

What is claimed is:

1. In an optical alignment structure for coupling output optical radiation from a source of the same to an optical receiving device, the combination comprising:
   (a) a rigid outer block having an opening for the receipt of optical radiation to flow within a cavity therein;
   (b) a lens holder within said cavity for positioning coupling optics to interact with optical radiation flowing on an optic axis within said cavity;
   (c) a flex connection physically attaching said lens holder to said block with said lens holder suspended in said cavity on said optic axis; and
   (d) means for adjusting the position of said holder within said block.

2. In an optical alignment structure for coupling output optical radiation from a source of the same to an optical receiving device, the combination comprising:
   (a) a rigid outer block having an opening for the receipt of optical radiation to flow within a cavity therein;
   (b) a lens holder within said cavity for positioning coupling optics therewithin to interact with optical radiation flowing on an optic axis which extends through said cavity;
   (c) a flex connection physically attaching said lens holder to said block with said lens holder suspended in said cavity on said optic axis;
   (d) means for adjusting the position of said holder relative to said block transverse to the optic axis therewithin;
   (e) a ferrule positioned to hold said optical receiving device on said optic axis to receive optical radiation from coupling optics held thereon by said lens holder, the position of said ferrule longitudinally along said axis being adjustable relative to the position of said block; and (f) means for securing said ferrule and, hence, said optical receiving device at a selected position along said optic axis relative to said lens.

3. The combination of any one of the previous claims further including a laser diode secured by said block with the radiation emission facet thereof positioned to direct optical radiation along said optic axis.

4. The combination of claim 3 wherein said laser diode is secured by said block in good thermal contact therewith.

5. The combination of claim 1 wherein said means for adjusting the position of said holder includes an adjustment screw which is threadably received in said block and interacts with said lens holder to change the transverse position of said coupling optics relative to said optic axis when said adjustment screw is turned relative to said block.

6. The combination of claim 5 wherein there are at least two of said adjustment screws spaced from one another to adjust said position about axes which are generally orthogonally related to one another, 7. The combination of claim 5 wherein an end of said lens holder is connected with said flex connection to said block to maintain said holder in position in said cavity while allowing said position adjustment relative to said optic axis.

8. The combination of claim 1 wherein the aspect ratio of said flex connection is selected to place and retain the center about which said lens holder is moved by said adjustment screw on said axis irrespective of typical position adjustment of said holder.

9. The combination of claim 8 wherein said aspect ratio is selected to also place a focal point of the coupling optics to be held thereby on said axis.

10. The combination of claim 2 wherein said means for securing said ferrule includes a set screw which is threadably received in said block to bear against said ferrule and hold the latter in a selected position longitudinally along said optic axis.

11. In an optical alignment structure for coupling output optical radiation from a source of the same to an optical receiving device, the combination comprising:

(a) a rigid outer block having an opening for the receipt of optical radiation to flow within a cavity therein;

(b) a lens holder within said cavity for positioning coupling optics to interact with optical radiation flowing on said optic axis within said cavity;

(c) a flex connection physically attaching said lens holder to said block with said lens holder suspended in said cavity on said optic axis; and (d) an end of said lens holder being physically attached with said flex connection to said block to maintain said holder in position in said cavity while allowing the transverse position of said holder relative to said block and said optic axis to be adjusted.

12. An optical alignment structure for coupling output optical radiation from a laser diode to the end of an optical fiber, comprising:

(a) a rigid outer block made up of:
  (1) a main block part having a first open end for receiving said laser diode and a cavity for a lens set to receive the output of said diode, which cavity includes an optic axis along which optical radiation flows;
  (2) an intermediate block part; and
  (3) an end closure block part for positioning said end of said optical fiber on said optic axis;

(b) a pair of coupling focusing lenses making up coupling optics having at least one focal point;

(c) a cylindrical lens holder for said pair of lenses, positioning the same in said cavity to interact with optical radiation from said laser diode on said optic axis;

(d) a flex connection extending between said lens holder and said intermediate block part cantilevering said lens holder within said cavity;

(e) A plurality of adjustment screws threadably received in said main block part to interact with said lens holder to change the transverse position of the same in said block relative to said optic axis, the aspect ratio of said flex connection being selected to place both the center about which the lens holder is moved by said adjustment screw and said focal point on said axis;

(f) a ferrule sleeve circumscribing said end of said optical fiber, which ferrule is positioned by said end closure on said optic axis and extends through said end closure to optically communicate said optical fiber with said cavity on said optic axis; and (g) a set screw threadably received in said end closure block part to bear against said ferrule and hold the latter in a selected position longitudinally along said optic axis.

13. The combination of claim 1 wherein said flex connection is a cantilever which suspends said lens holder within said block cavity on said optic axis.

14. The combination of claim 13 wherein the structure of said cantilever is selected to place a movement center for said lens holder on said optic axis at the focal point of selected coupling optics.

15. The combination of claim 14 wherein said cantilever is at one end of said lens holder and an adjustment screw bears against said lens holder to adjust the location of said free end to provide said transverse movement of said lens holder by tilting the same about said focal point.

16. The combination of claim 1 further including a ferrule to hold said optical receiving device on said optic axis, the position of said ferrule longitudinally along said axis being adjustable relative to the position of said block, and means are provided for securing said ferrule and, hence, said optical receiving device, at a selected position along said optic axis.

* * * * *